United States Patent
Yang et al.

(10) Patent No.: US 9,525,522 B2
(45) Date of Patent: Dec. 20, 2016

(54) SYSTEMS AND METHODS FOR IMPROVED COMMUNICATION EFFICIENCY IN HIGH EFFICIENCY WIRELESS NETWORKS

(71) Applicant: QUALCOMM Incorporated, San Diego, CA (US)

(72) Inventors: Lin Yang, San Diego, CA (US); Jialing Li Chen, San Diego, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/614,294

(22) Filed: Feb. 4, 2015

(65) Prior Publication Data
US 2015/0223247 A1 Aug. 6, 2015

Related U.S. Application Data

(60) Provisional application No. 61/936,288, filed on Feb. 5, 2014.

(51) Int. Cl.
*H04L 5/00* (2006.01)
(52) U.S. Cl.
CPC ........... *H04L 5/0007* (2013.01); *H04L 5/0037* (2013.01)
(58) Field of Classification Search
CPC .... H04L 5/0023; H04L 5/0007; H04L 5/0037; H04L 5/0048; H04L 25/028; H04L 27/2601; H04L 5/0041; H04L 27/262; H04L 27/2675
See application file for complete search history.

(56) References Cited

U.S. PATENT DOCUMENTS

| | | | |
|---|---|---|---|
| 7,817,735 B2* | 10/2010 | Song et al. | 375/260 |
| 8,948,284 B2* | 2/2015 | Park et al. | 375/260 |
| 2004/0081123 A1 | 4/2004 | Krishnan et al. | |
| 2010/0014603 A1* | 1/2010 | Palanki et al. | 375/260 |
| 2010/0246505 A1* | 9/2010 | Chong et al. | 370/329 |
| 2010/0278290 A1* | 11/2010 | Huang et al. | 375/346 |

(Continued)

FOREIGN PATENT DOCUMENTS

DE GB 2434279 A * 7/2007 ........... H04B 7/2656

OTHER PUBLICATIONS

Banani Roy et al., "Interference aware dynamic subchannel allocation in a multi-cellular OFDMA system based on traffic situation," Dec. 4, 2006, all pages.*

(Continued)

*Primary Examiner* — Curtis A Alia
(74) *Attorney, Agent, or Firm* — Knobbe Martens Olson & Bear LLP

(57) ABSTRACT

Methods and apparatus methods and apparatus for providing wireless messages according to various tone plans. In one aspect, an apparatus includes a processing system configured to allocate a resource for wireless communication to each of a plurality of devices. The resource includes at least one of a sub-band of frequencies or a subset of data tones within a single uplink or downlink tone plan. The processing system is further configured to provide the resource allocation to the devices. The processing system is further configured to process a message according to one of an uplink or downlink tone plan associated with at least one of the allocated sub-band or the allocated subset.

28 Claims, 7 Drawing Sheets

(56) References Cited

U.S. PATENT DOCUMENTS

2011/0034198 A1 2/2011 Chen et al.
2011/0044231 A1* 2/2011 Shahar .......................... 370/312

OTHER PUBLICATIONS

International Search Report and Written Opinion—PCT/US2015/014653—ISA/EPO—Apr. 14, 2015.
Park M, "Proposed Specification Framework for TGah Author(s): Name Affiliation Address Phone email", Nov. 1, 2012 (Nov. 1, 2012), XP055166824, Retrieved from the Internet: URL: https://mentor.ieee.org/802.11/dcn/11/11-11-1137-12-00ah-specification-framework-for-tgah.docx [retrieved on Feb. 3, 2015] 50 pages.

* cited by examiner

SYSTEMS AND METHODS FOR IMPROVED COMMUNICATION EFFICIENCY IN HIGH EFFICIENCY WIRELESS NETWORKS

CROSS-REFERENCE TO RELATED APPLICATIONS

The present application claims priority to U.S. Provisional Application No. 61/936,288, filed Feb. 5, 2014, which is hereby incorporated by reference herein.

FIELD

Certain aspects of the present disclosure generally relate to wireless communications, and more particularly, to methods and apparatus for providing messages according to various tone plans.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in high efficiency wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus for wireless communication. The apparatus includes a processing system configured to allocate a resource for wireless communication to each of a plurality of devices. The resource includes at least one of a sub-band of frequencies or a subset of data tones within a single uplink or downlink tone plan. The processing system is further configured to provide the resource allocation to the devices. The processing system is further configured to process a message according to one of an uplink or downlink tone plan associated with at least one of the allocated sub-band or the allocated subset.

In various aspects, the uplink tone plan and the downlink tone plan can be the same. In various aspects, the uplink tone plan is different from the downlink tone plan. In various aspects, each of the allocated subsets further can include one or more pilot tones. In various aspects, the message can include a symbol duration of 13.6 μs, 14.4 μs, or 16 μs.

In various aspects, the processing system is further configured to allocate the resource by determining at least one of an available bandwidth or an available number of data tones, based on a communication mode of the apparatus. The processing system can be further configured to dividing the available bandwidth or available number of data tones into a plurality of sub-bands of frequencies or subsets of data tones, respectively. In various aspects, the processing system is further configured to encode or decode the message according to the downlink or uplink tone plan, respectively.

In various aspects, the uplink or downlink tone plan can use a Fast Fourier Transform (FFT) size of 64 if the bandwidth comprises 5 MHz. The uplink or downlink tone plan can use a FFT size of 128 if the bandwidth comprises 10 MHz. The uplink or downlink tone plan can use a FFT size of 64 if the bandwidth comprises 5 MHz. The uplink or downlink tone plan can use a FFT size of 128 if the bandwidth comprises 10 MHz. The uplink or downlink tone plan can use a FFT size of 192 if the bandwidth comprises 15 MHz. The uplink or downlink tone plan can use a FFT size of 256 if the bandwidth comprises 20 MHz. The uplink or downlink tone plan can use a FFT size of 384 if the bandwidth comprises 30 MHz. The uplink or downlink tone plan can use a FFT size of 512 if the bandwidth comprises 40 MHz. The uplink or downlink tone plan can use a FFT size of 768 if the bandwidth comprises 60 MHz. The uplink or downlink tone plan can use a FFT size of 1024 if the bandwidth comprises 80 MHz. The uplink or downlink tone plan can use a FFT size of 1280 if the bandwidth comprises 100 MHz. The uplink or downlink tone plan can use a FFT size of 1536 if the bandwidth comprises 120 MHz. The uplink or downlink tone plan can use a FFT size of 1792 if the bandwidth comprises 140 MHz. The uplink or downlink tone plan can use a FFT size of 2048 if the bandwidth comprises 160 MHz.

In various aspects, the uplink or downlink tone plan can include 10 data tones, 2 pilot tones, and 1 direct current (DC) tone if the tone plan has 16 FFT tones. The tone plan can include 38 data tones, 2 pilot tones, and 1 DC tone if the tone plan has 48 FFT tones. The tone plan can include 80 data tones, 4 pilot tones, and 1 DC tone if the tone plan has 96 FFT tones. The tone plan can include 171 data tones, 6 pilot tones, and 3 DC if the tone plan has 192 FFT tones. The tone plan can include 292 data tones, 8 pilot tones, and 5 DC if the tone plan has 320 FFT tones. The tone plan can include 350 data tones, 10 pilot tones, and 7 DC if the tone plan has 384 FFT tones. The tone plan can include 408 data tones, 10 pilot tones, and 9 DC if the tone plan has 448 FFT tones. The tone plan can include 702 data tones, 24 pilot tones, and 11 DC if the tone plan has 768 FFT tones. The tone plan can include 936 data tones, 32 pilot tones, and 11 DC if the tone plan has 1024 FFT tones. The tone plan can include 1170 data tones, 40 pilot tones, and 11 DC if the tone plan has 1280 FFT tones. The tone plan can include 1404 data tones, 48 pilot tones, and 11 DC if the tone plan has 1536 FFT tones. The tone plan can include 1638 data tones, 56 pilot tones, and 11 DC if the tone plan has 1792 FFT tones. The tone plan can include 1872 data tones, 64 pilot tones, and 11 DC if the tone plan has 2048 FFT tones.

In various aspects, each of the allocated subsets for the downlink tone plan can include no more than 13 data tones if a bandwidth of the subset includes 5 MHz. Each of the allocated subsets can include no more than 26 data tones if a bandwidth of the subset includes 10 MHz. Each of the allocated subsets can include no more than 39 data tones if a bandwidth of the subset includes 15 MHz. Each of the allocated subsets can include no more than 52 data tones if a bandwidth of the subset includes 20 MHz. Each of the allocated subsets can include no more than 81 data tones if a bandwidth of the subset includes 30 MHz. Each of the allocated subsets can include no more than 108 data tones if a bandwidth of the subset includes 40 MHz. Each of the allocated subsets can include no more than 175 data tones if a bandwidth of the subset includes 60 MHz. Each of the allocated subsets can include no more than 234 data tones if a bandwidth of the subset includes 80 MHz. Each of the allocated subsets can include no more than 292 data tones if a bandwidth of the subset includes 100 MHz. Each of the allocated subsets can include no more than 351 data tones if a bandwidth of the subset includes 120 MHz. Each of the allocated subsets can include no more than 409 data tones if a bandwidth of the subset includes 140 MHz.

In various aspects, each of the allocated subsets for the uplink tone plan can include no more than 10 data tones and 2 pilot tones if a bandwidth of the subset includes 5 MHz. Each of the allocated subsets can include no more than 23 data tones and 2 pilot tones if a bandwidth of the subset includes 10 MHz. Each of the allocated subsets can include no more than 35 data tones and 2 pilot tones if a bandwidth of the subset includes 15 MHz. Each of the allocated subsets can include no more than 46 data tones and 4 pilot tones if a bandwidth of the subset includes 20 MHz. Each of the allocated subsets can include no more than 77 data tones and 4 pilot tones if a bandwidth of the subset includes 30 MHz. Each of the allocated subsets can include no more than 102 data tones and 6 pilot tones if a bandwidth of the subset includes 40 MHz. Each of the allocated subsets can include no more than 171 data tones and 6 pilot tones if a bandwidth of the subset includes 60 MHz. Each of the allocated subsets can include no more than 228 data tones and 8 pilot tones if a bandwidth of the subset includes 80 MHz. Each of the allocated subsets can include no more than 290 data tones and 8 pilot tones if a bandwidth of the subset includes 100 MHz. Each of the allocated subsets can include no more than 348 data tones and 10 pilot tones if a bandwidth of the subset includes 120 MHz. Each of the allocated subsets can include no more than 408 data tones and 10 pilot tones if a bandwidth of the subset includes 140 MHz.

Another aspect provides a method of wireless communication. The method includes allocating a resource for wireless communication to each of a plurality of devices. The resource includes at least one of a sub-band of frequencies or a subset of data tones within a single uplink or downlink tone plan. The method further includes providing the resource allocation to the devices. The method further includes processing a message according to one of an uplink or downlink tone plan associated with at least one of the allocated sub-band or the allocated subset.

In various aspects, the uplink tone plan and the downlink tone plan can be the same. In various aspects, the uplink tone plan is different from the downlink tone plan. In various aspects, each of the allocated subsets further can include one or more pilot tones. In various aspects, the message can include a symbol duration of 13.6 μs, 14.4 μs, or 16 μs.

In various aspects, said allocating can include determining at least one of an available bandwidth or an available number of data tones, based on a communication mode of the apparatus. The method can further include dividing the available bandwidth or available number of data tones into a plurality of sub-bands of frequencies or subsets of data tones, respectively. In various aspects, the method can further include encoding or decoding the message according to the downlink or uplink tone plan, respectively.

In various aspects, the uplink or downlink tone plan can use a Fast Fourier Transform (FFT) size of 64 if the bandwidth comprises 5 MHz. The uplink or downlink tone plan can use a FFT size of 128 if the bandwidth comprises 10 MHz. The uplink or downlink tone plan can use a FFT size of 64 if the bandwidth comprises 5 MHz. The uplink or downlink tone plan can use a FFT size of 128 if the bandwidth comprises 10 MHz. The uplink or downlink tone plan can use a FFT size of 192 if the bandwidth comprises 15 MHz. The uplink or downlink tone plan can use a FFT size of 256 if the bandwidth comprises 20 MHz. The uplink or downlink tone plan can use a FFT size of 384 if the bandwidth comprises 30 MHz. The uplink or downlink tone plan can use a FFT size of 512 if the bandwidth comprises 40 MHz. The uplink or downlink tone plan can use a FFT size of 768 if the bandwidth comprises 60 MHz. The uplink or downlink tone plan can use a FFT size of 1024 if the bandwidth comprises 80 MHz. The uplink or downlink tone plan can use a FFT size of 1280 if the bandwidth comprises 100 MHz. The uplink or downlink tone plan can use a FFT size of 1536 if the bandwidth comprises 120 MHz. The uplink or downlink tone plan can use a FFT size of 1792 if the bandwidth comprises 140 MHz. The uplink or downlink tone plan can use a FFT size of 2048 if the bandwidth comprises 160 MHz.

In various aspects, the uplink or downlink tone plan can include 10 data tones, 2 pilot tones, and 1 direct current (DC) tone if the tone plan has 16 FFT tones. The tone plan can include 38 data tones, 2 pilot tones, and 1 DC tone if the tone plan has 48 FFT tones. The tone plan can include 80 data tones, 4 pilot tones, and 1 DC tone if the tone plan has 96 FFT tones. The tone plan can include 171 data tones, 6 pilot tones, and 3 DC if the tone plan has 192 FFT tones. The tone plan can include 292 data tones, 8 pilot tones, and 5 DC if the tone plan has 320 FFT tones. The tone plan can include 350 data tones, 10 pilot tones, and 7 DC if the tone plan has 384 FFT tones. The tone plan can include 408 data tones, 10 pilot tones, and 9 DC if the tone plan has 448 FFT tones. The tone plan can include 702 data tones, 24 pilot tones, and 11 DC if the tone plan has 768 FFT tones. The tone plan can include 936 data tones, 32 pilot tones, and 11 DC if the tone plan has 1024 FFT tones. The tone plan can include 1170 data tones, 40 pilot tones, and 11 DC if the tone plan has 1280 FFT tones. The tone plan can include 1404 data tones, 48 pilot tones, and 11 DC if the tone plan has 1536 FFT tones. The tone plan can include 1638 data tones, 56 pilot tones, and 11 DC if the tone plan has 1792 FFT tones. The tone plan can include 1872 data tones, 64 pilot tones, and 11 DC if the tone plan has 2048 FFT tones.

In various aspects, each of the allocated subsets for the downlink tone plan can include no more than 13 data tones if a bandwidth of the subset includes 5 MHz. Each of the allocated subsets can include no more than 26 data tones if a bandwidth of the subset includes 10 MHz. Each of the allocated subsets can include no more than 39 data tones if a bandwidth of the subset includes 15 MHz. Each of the allocated subsets can include no more than 52 data tones if a bandwidth of the subset includes 20 MHz. Each of the allocated subsets can include no more than 81 data tones if a bandwidth of the subset includes 30 MHz. Each of the allocated subsets can include no more than 108 data tones if a bandwidth of the subset includes 40 MHz. Each of the allocated subsets can include no more than 175 data tones if a bandwidth of the subset includes 60 MHz. Each of the allocated subsets can include no more than 234 data tones if a bandwidth of the subset includes 80 MHz. Each of the allocated subsets can include no more than 292 data tones if a bandwidth of the subset includes 100 MHz. Each of the allocated subsets can include no more than 351 data tones if a bandwidth of the subset includes 120 MHz. Each of the allocated subsets can include no more than 409 data tones if a bandwidth of the subset includes 140 MHz.

In various aspects, each of the allocated subsets for the uplink tone plan can include no more than 10 data tones and 2 pilot tones if a bandwidth of the subset includes 5 MHz. Each of the allocated subsets can include no more than 23 data tones and 2 pilot tones if a bandwidth of the subset includes 10 MHz. Each of the allocated subsets can include no more than 35 data tones and 2 pilot tones if a bandwidth of the subset includes 15 MHz. Each of the allocated subsets can include no more than 46 data tones and 4 pilot tones if a bandwidth of the subset includes 20 MHz. Each of the allocated subsets can include no more than 77 data tones and 4 pilot tones if a bandwidth of the subset includes 30 MHz. Each of the allocated subsets can include no more than 102 data tones and 6 pilot tones if a bandwidth of the subset includes 40 MHz. Each of the allocated subsets can include no more than 171 data tones and 6 pilot tones if a bandwidth of the subset includes 60 MHz. Each of the allocated subsets can include no more than 228 data tones and 8 pilot tones if a bandwidth of the subset includes 80 MHz. Each of the allocated subsets can include no more than 290 data tones and 8 pilot tones if a bandwidth of the subset includes 100 MHz. Each of the allocated subsets can include no more than 348 data tones and 10 pilot tones if a bandwidth of the subset includes 120 MHz. Each of the allocated subsets can include no more than 408 data tones and 10 pilot tones if a bandwidth of the subset includes 140 MHz.

Another aspect provides another apparatus for wireless communication. The apparatus includes means for allocating a resource for wireless communication to each of a plurality of devices. The resource includes at least one of a sub-band of frequencies or a subset of data tones within a single uplink or downlink tone plan. The apparatus further includes means for providing the resource allocation to the devices. The apparatus further includes means for processing a message according to one of an uplink or downlink tone plan associated with at least one of the allocated sub-band or the allocated subset.

In various aspects, the uplink or downlink tone plan can use a Fast Fourier Transform (FFT) size of 64 if the bandwidth comprises 5 MHz. The uplink or downlink tone plan can use a FFT size of 128 if the bandwidth comprises 10 MHz. The uplink or downlink tone plan can use a FFT size of 64 if the bandwidth comprises 5 MHz. The uplink or downlink tone plan can use a FFT size of 128 if the bandwidth comprises 10 MHz. The uplink or downlink tone plan can use a FFT size of 192 if the bandwidth comprises 15 MHz. The uplink or downlink tone plan can use a FFT size of 256 if the bandwidth comprises 20 MHz. The uplink or downlink tone plan can use a FFT size of 384 if the bandwidth comprises 30 MHz. The uplink or downlink tone plan can use a FFT size of 512 if the bandwidth comprises 40 MHz. The uplink or downlink tone plan can use a FFT size of 768 if the bandwidth comprises 60 MHz. The uplink or downlink tone plan can use a FFT size of 1024 if the bandwidth comprises 80 MHz. The uplink or downlink tone plan can use a FFT size of 1280 if the bandwidth comprises 100 MHz. The uplink or downlink tone plan can use a FFT size of 1536 if the bandwidth comprises 120 MHz. The uplink or downlink tone plan can use a FFT size of 1792 if the bandwidth comprises 140 MHz. The uplink or downlink tone plan can use a FFT size of 2048 if the bandwidth comprises 160 MHz.

In various aspects, the uplink or downlink tone plan can include 10 data tones, 2 pilot tones, and 1 direct current (DC) tone if the tone plan has 16 FFT tones. The tone plan can include 38 data tones, 2 pilot tones, and 1 DC tone if the tone plan has 48 FFT tones. The tone plan can include 80 data tones, 4 pilot tones, and 1 DC tone if the tone plan has 96 FFT tones. The tone plan can include 171 data tones, 6 pilot tones, and 3 DC if the tone plan has 192 FFT tones. The tone plan can include 292 data tones, 8 pilot tones, and 5 DC if the tone plan has 320 FFT tones. The tone plan can include 350 data tones, 10 pilot tones, and 7 DC if the tone plan has 384 FFT tones. The tone plan can include 408 data tones, 10 pilot tones, and 9 DC if the tone plan has 448 FFT tones. The tone plan can include 702 data tones, 24 pilot tones, and 11 DC if the tone plan has 768 FFT tones. The tone plan can include 936 data tones, 32 pilot tones, and 11 DC if the tone plan has 1024 FFT tones. The tone plan can include 1170 data tones, 40 pilot tones, and 11 DC if the tone plan has 1280 FFT tones. The tone plan can include 1404 data tones, 48 pilot tones, and 11 DC if the tone plan has 1536 FFT tones. The tone plan can include 1638 data tones, 56 pilot tones, and 11 DC if the tone plan has 1792 FFT tones. The tone plan can include 1872 data tones, 64 pilot tones, and 11 DC if the tone plan has 2048 FFT tones.

In various aspects, each of the allocated subsets for the downlink tone plan can include no more than 13 data tones if a bandwidth of the subset includes 5 MHz. Each of the allocated subsets can include no more than 26 data tones if a bandwidth of the subset includes 10 MHz. Each of the allocated subsets can include no more than 39 data tones if a bandwidth of the subset includes 15 MHz. Each of the allocated subsets can include no more than 52 data tones if a bandwidth of the subset includes 20 MHz. Each of the allocated subsets can include no more than 81 data tones if a bandwidth of the subset includes 30 MHz. Each of the allocated subsets can include no more than 108 data tones if a bandwidth of the subset includes 40 MHz. Each of the allocated subsets can include no more than 175 data tones if a bandwidth of the subset includes 60 MHz. Each of the allocated subsets can include no more than 234 data tones if a bandwidth of the subset includes 80 MHz. Each of the allocated subsets can include no more than 292 data tones if a bandwidth of the subset includes 100 MHz. Each of the allocated subsets can include no more than 351 data tones if a bandwidth of the subset includes 120 MHz. Each of the allocated subsets can include no more than 409 data tones if a bandwidth of the subset includes 140 MHz.

In various aspects, each of the allocated subsets for the uplink tone plan can include no more than 10 data tones and 2 pilot tones if a bandwidth of the subset includes 5 MHz. Each of the allocated subsets can include no more than 23 data tones and 2 pilot tones if a bandwidth of the subset includes 10 MHz. Each of the allocated subsets can include no more than 35 data tones and 2 pilot tones if a bandwidth of the subset includes 15 MHz. Each of the allocated subsets can include no more than 46 data tones and 4 pilot tones if a bandwidth of the subset includes 20 MHz. Each of the allocated subsets can include no more than 77 data tones and 4 pilot tones if a bandwidth of the subset includes 30 MHz. Each of the allocated subsets can include no more than 102 data tones and 6 pilot tones if a bandwidth of the subset includes 40 MHz. Each of the allocated subsets can include no more than 171 data tones and 6 pilot tones if a bandwidth of the subset includes 60 MHz. Each of the allocated subsets can include no more than 228 data tones and 8 pilot tones if a bandwidth of the subset includes 80 MHz. Each of the allocated subsets can include no more than 290 data tones and 8 pilot tones if a bandwidth of the subset includes 100 MHz. Each of the allocated subsets can include no more than 348 data tones and 10 pilot tones if a bandwidth of the subset includes 120 MHz. Each of the allocated subsets can include no more than 408 data tones and 10 pilot tones if a bandwidth of the subset includes 140 MHz.

Another aspect provides a wireless node. The node includes an antenna and a processing system. The processing system is configured to allocate a resource for wireless communication to each of a plurality of devices. The resource includes at least one of a sub-band of frequencies or a subset of data tones within a single uplink or downlink tone plan. The processing system is further configured to provide the resource allocation to the devices. The processing system is further configured to process a message according to one of an uplink or downlink tone plan associated with at least one of the allocated sub-band or the allocated subset.

DETAILED DESCRIPTION

Figure 1:
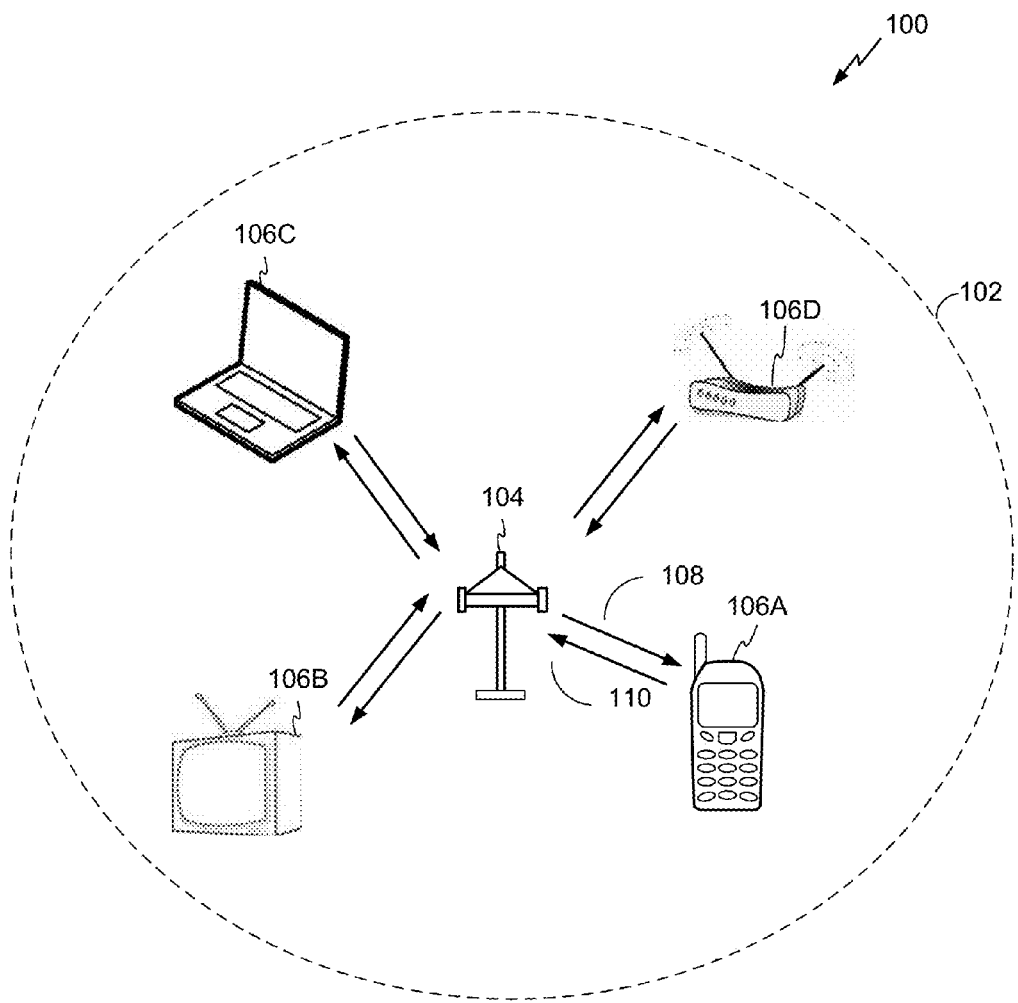
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement the 802.11ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
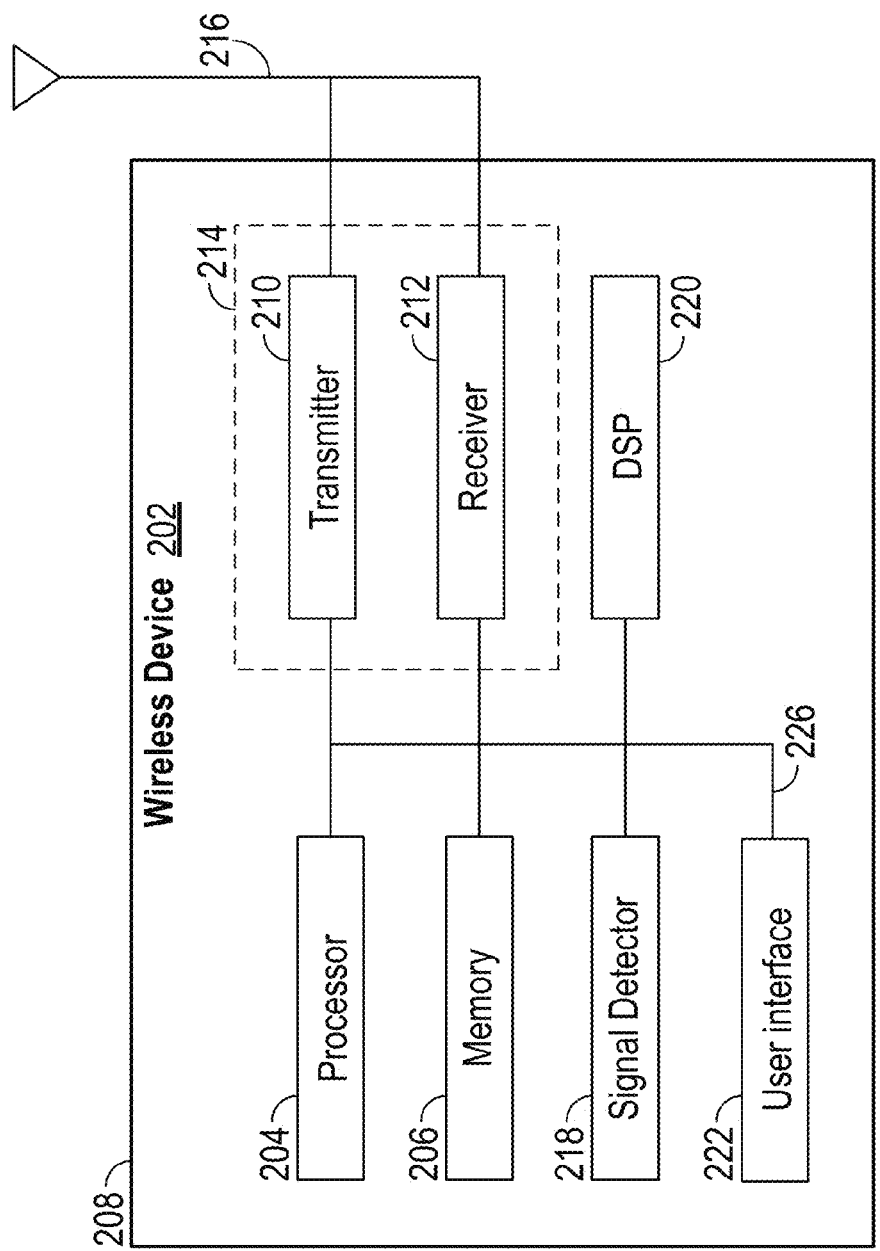
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include a computer program product for communication comprising a computer-readable medium encoded thereon with instructions that, when executed, causes an apparatus to perform one or more steps associated with one or more methods for modifying relay operation of a relay-compatible wireless device. Instructions may include source code format, binary code format, executable code format, or any other suitable format of code. The code, or instructions, when executed by one or more processors, causes the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate for access to a wireless medium. In some aspects, the high-efficiency 802.11 protocol described herein can allow for HEW and legacy stations to interoperate according to various OFDM tone plans. In some aspects, HEW stations can access the wireless medium in a more efficient manner. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some aspects, APs 104 can control access to a wireless medium by allocating DL and UL tone plans for HEW and/or legacy STAs. For example, with respect to FIG. 1, STAs 106A-106C can be HEW STAs and 106D can be a legacy STA. In this aspect, it can be desirable to allow concurrent operation between the HEW STAs 106A-106C and the legacy STA 106D. In some aspects, the AP 104 can be configured to allocate separate physical sub-bands to each of the STAs 106A-106D. Thus, each STA 106A-106D can be configured to access its allocated physical sub-band according to an individual tone plan (which can also be referred to as a tone map).

Figure 3:
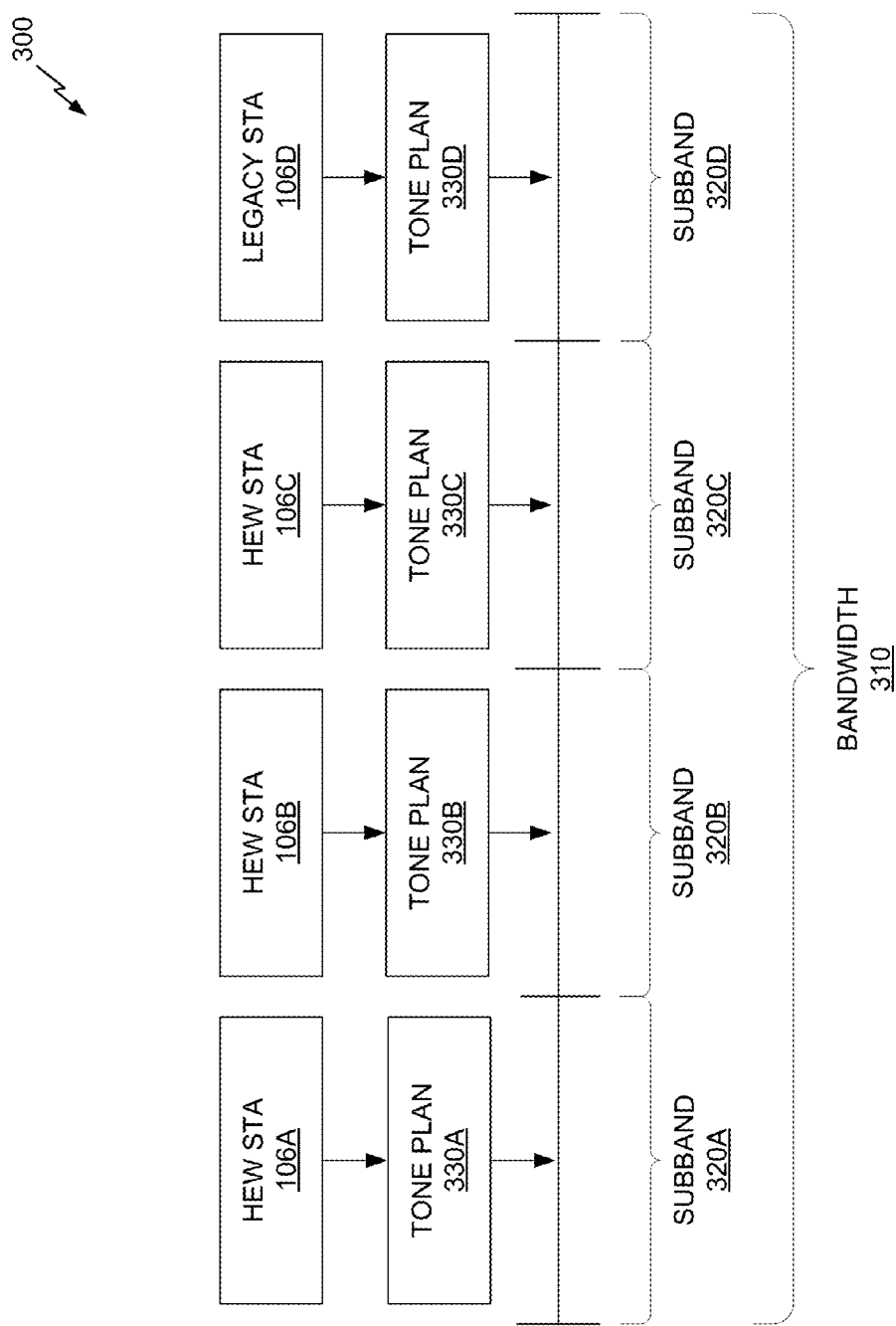
FIG. 3 is a diagram of an exemplary bandwidth allocation, according to one aspect.

FIG. 3 is a diagram of an exemplary bandwidth allocation 300, according to one aspect. As shown in FIG. 3, an OFDMA zone can include a bandwidth 310. The bandwidth 310 can be divided into one or more sub-bands 320A-320D. For example, the bandwidth 310 can be 80 MHz, and can be divided into four 20 MHz sub-bands 320A-320D. However, a person having ordinary skill in the art will appreciate that the bandwidth 310 can be a different size, and can be divided into a different number of sub-bands, which in turn can have various equal or differing sizes.

Referring to FIGS. 1 and 3, the AP 104 can allocate each of the STAs 106A-106D to a separate sub-band 320A-320D. Moreover, separate tone plans 330A-330D can be associated with each sub-band 320A-320D. In various aspects, the tone plans 330A-330D can have various Fast Fourier Transform (FFT) sizes based on the bandwidth of each sub-band 320A-320D. Although the term FFT is used herein, a person having ordinary skill in the art will appreciate that other transforms can be used in various circumstances, such as a Discrete Fourier Transform (DFT), an inverse DFT (IDFT), and an inverse FFT (IFFT). Table 1, below, shows exemplary tone plan sizes for various symbol duration modes, according to various aspects. As shown in Table 1, increasing the symbol duration by a factor of 4 can be realized by increasing the FFT size by a factor of 4. In various aspects, a 1× symbol duration can be 4 μs (e.g., 3.2 μs for the effective symbol duration and a cyclic prefix of 0.8 μs) and a 4× symbol duration can be 13.6 μs, 14.4 μs, or 16 μs (e.g., 4 times 3.2 μs, which is 12.8 μs, and cyclic prefix durations of 0.8 μs, 1.6 μs, or 3.2 μs). A person having ordinary skill in the art will appreciate that other symbol durations can be used.

TABLE 1

| Bandwidth (MHz) | FFT Size for 1× Duration (Points) | FFT Size for 4× Duration (Points) |
|---|---|---|
| 5 | 16 | 64 |
| 10 | 32 | 128 |
| 15 | 48 | 192 |
| 20 | 64 | 256 |
| 30 | 96 | 384 |
| 40 | 128 | 512 |
| 60 | 192 | 768 |
| 80 | 256 | 1024 |
| 100 | 320 | 1280 |
| 120 | 384 | 1536 |
| 140 | 448 | 1792 |
| 160 | 512 | 2048 |

Thus, in the exemplary aspect where the bandwidth 310 is 80 MHz, and is divided into four 20 MHz sub-bands 320A-320D, the STAs 106A-106D can transmit and/or receive 1× symbol duration messages according to a 64-tone plan, and can transmit and/or receive 4× symbol duration messages according to a 256-tone plan. Moreover, because each of the STAs 106A-106D is allocated a separate physical sub-band, the HEW STAs 106A-106C and the legacy STA 106D can interoperate without change in tone definition.

Each of the FFT sizes shown above in Table 1 can be associated with a HEW tone plan 330A-330D. An exemplary tone plan is discussed below with respect to FIG. 4. Similarly, because each of the STAs 106A-106D transmits and/or receives messages according to an independent tone plan, a common interleaver design can be used.

Figure 4:
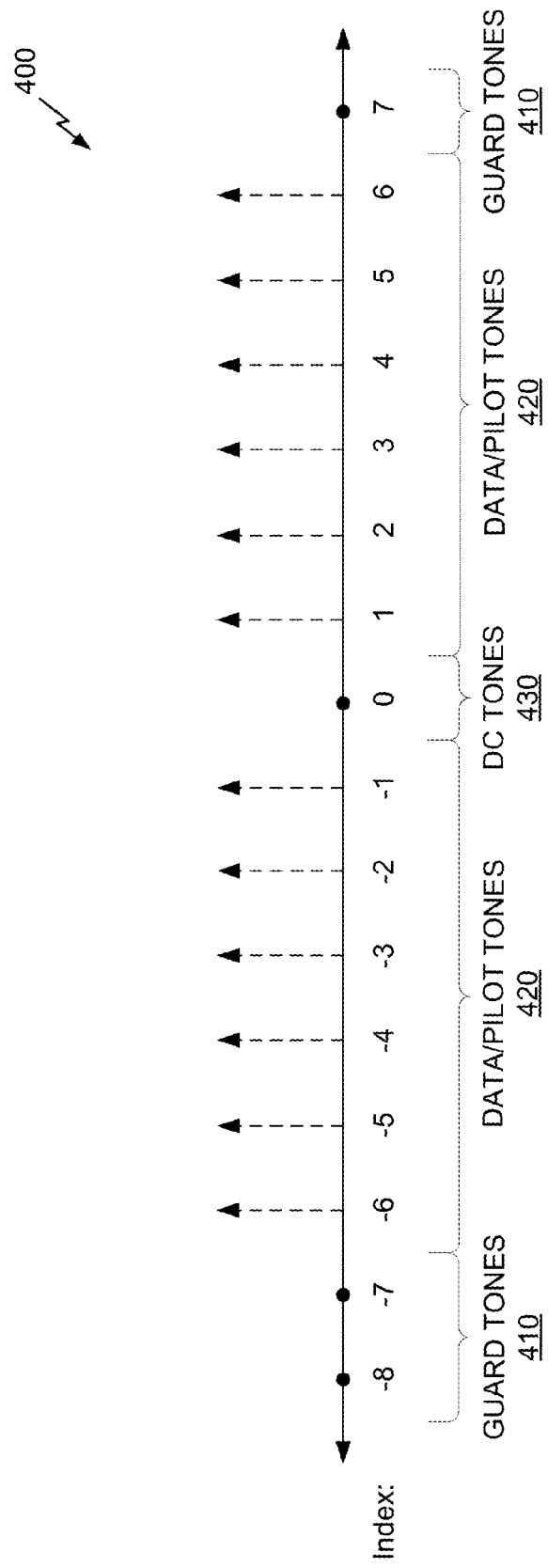
FIG. 4 shows an exemplary tone plan according to one aspect.

FIG. 4 shows an exemplary tone plan 400, according to one aspect. In an aspect, the tone plan 400 corresponds to OFDM tones, in the frequency domain, generated using a 16-point IFFT. The tone plan 400 includes 16 OFDM tones indexed −8 to 7. The tone plan 400 includes two sets of guard tones 410, two sets of data/pilot tones 420, and a set of direct current (DC) tones 430. In various aspects, the guard tones 410 and DC tones 430 can be null. In an aspect, the data/pilot tones 420 can include 10 data tones and 2 pilot tones. In various aspects, the tone plan 400 includes another suitable number of pilot tones and/or includes pilot tones at other suitable tone locations.

Although a 16-tone plan 400 is shown in FIG. 4, similar tone plans can be used (such as 32-, 48-, 64-, 96-, 128-, 192-, 256-, 320-, 384-, 448-, 512-, 768-, 1024, 1280-, 1536-, 1792-, and 2048-tone plans). Table 2, below, shows exemplary tone plans for various FFT sizes, according to various aspects. A person having ordinary skill in the art will appreciate that other combinations of data, pilot, DC, and guard tones can be used.

TABLE 2

| FFT size | Data Tones | Pilot Tones | DC Tones | Guard Tones |
|---|---|---|---|---|
| 16 | 10 | 2 | 1 | 3 |
| 32 | 24 | 2 | 1 | 5 |
| 48 | 38 | 2 | 1 | 7 |
| 64 | 52 | 4 | 1 | 7 |
| 96 | 80 | 4 | 1 | 11 |
| 128 | 108 | 6 | 3 | 11 |
| 192 | 171 | 6 | 3 | 12 |
| 256 | 234 | 8 | 3 | 11 |
| 320 | 292 | 8 | 5 | 15 |

TABLE 2-continued

| FFT size | Data Tones | Pilot Tones | DC Tones | Guard Tones |
|---|---|---|---|---|
| 384 | 350 | 10 | 7 | 17 |
| 448 | 408 | 10 | 9 | 21 |
| 512 | 468 | 16 | 7 | 21 |
| 768 | 702 | 24 | 11 | 31 |
| 1024 | 936 | 32 | 11 | 45 |
| 1280 | 1170 | 40 | 11 | 59 |
| 1536 | 1404 | 48 | 11 | 73 |
| 1792 | 1638 | 56 | 11 | 87 |
| 2048 | 1872 | 64 | 11 | 101 |

Figure 5:
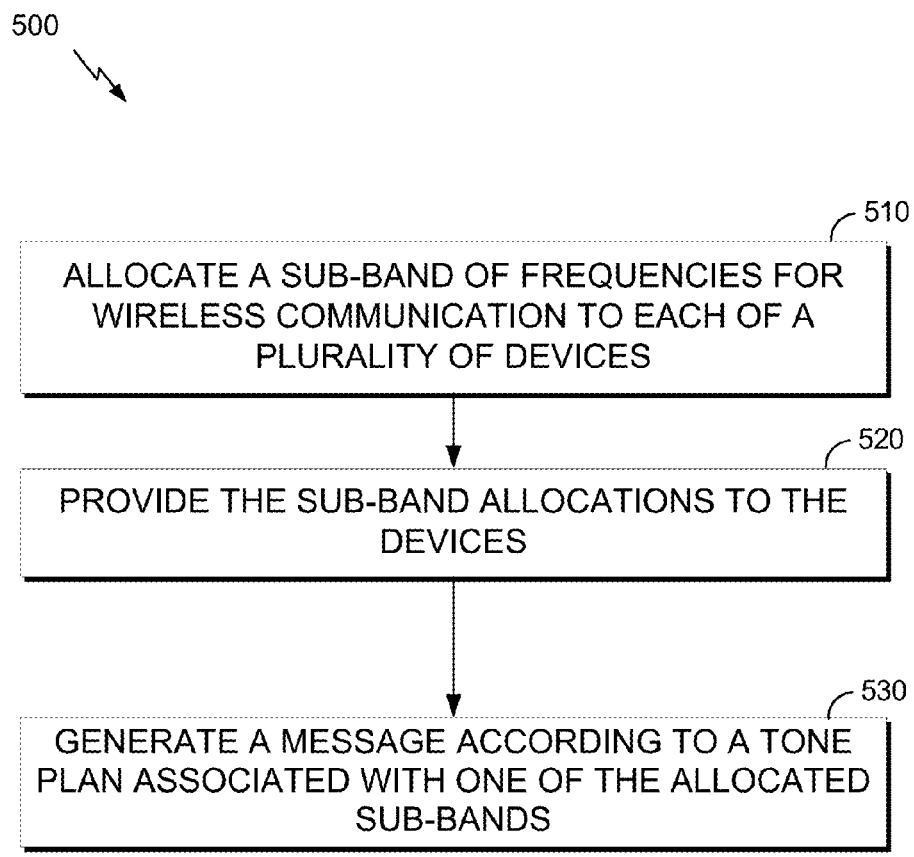
FIG. 5 shows a flowchart for an exemplary method of wireless communication that can be employed within the wireless communication system of FIG. 1.

FIG. 5 shows a flowchart 500 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the wireless device 202 discussed above with respect to FIG. 2, the bandwidth allocation 300 discussed above with respect to FIG. 3, and the tone plan 400 discussed above with respect to FIG. 4, a person having ordinary skill in the art will appreciate that the illustrated method can be implemented by another device described herein, or any other suitable device. Although the illustrated method is described herein with reference to a particular order, in various aspects, blocks herein can be performed in a different order, or omitted, and additional blocks can be added.

First, at block 510 the device 202 allocates a sub-band of frequencies for wireless communication to each of a plurality of devices. For example, the AP 104 can allocate each of the sub-bands 310A-320D to the STAs 106A-106D, respectively. In various aspects, each sub-band 310A-320D can be any of the bandwidths discussed above with respect to Table 1, and can be associated with a tone plan having any FFT size discussed above with respect to Table 2. In some aspects, the device 202 can allocate a resource including both the sub-band of frequencies and a subset of data tones within a single uplink or downlink tone plan.

In one aspect, the processor 204 can determine an available amount of bandwidth and a number of devices requesting access to the wireless medium. The processor 204 can allocate a maximum sub-band size to each device such that the available bandwidth is not exceeded. For example, the AP 104 can divide the 80 MHz OFDMA zone 310 by the number of STAs 106A-106D (four) and allocate 20 MHz sub-bands 320A-320B to each STA 106A-106D. In various other aspects, the processor 204 can allocate a larger sub-band to certain devices, for example based on a priority or capability of the STAs 106A-106D.

Next, at block 520, the device 202 provides the sub-band allocations to the devices. For example, the AP 104 can transmit an indication of the sub-band allocation to each STA 106A-106D. In particular, the processor 204 can cause the transmitter 210 to transmit the sub-band allocations to the STAs 106A-106D.

Then, at block 530, the device 202 processes a message according to a tone plan associated with one of the allocated sub-bands. For example, the AP 104 can transmit a DL message to the STA 106A on the physical sub-band 320A. Because the physical sub-band 320A is 20 MHz in an aspect, the AP 104 can encode and/or transmit the DL message according to a 64-tone plan (for 1× symbol duration) or 256-tone plan (for 4× symbol duration). As another example, in aspects where the physical sub-band 320A is 5 MHz, the AP 104 can encode and/or transmit the DL message according to the 16-tone plan 400, discussed above with respect to FIG. 4, for 1× symbol duration. In various aspects, the processor 204 can cause the transmitter 210 to encode and/or transmit the DL message according to the associated tone plan. In some aspects, the tone plan can be associated with both the allocated sub-band and an allocated subset of data tones within a single uplink or downlink tone plan.

As another example, the AP 104 can receive a UL message from the STA 106A on the physical sub-band 320A. Because the physical sub-band 320A is 20 MHz in an aspect, the AP 104 can decode and/or receive the UL message according to a 64-tone plan (for 1× symbol duration) or 256-tone plan (for 4× symbol duration). As another example, in aspects where the physical sub-band 320A is 5 MHz, the AP 104 can decode and/or receive the UL message according to the 16-tone plan 400, discussed above with respect to FIG. 4, for 1× symbol duration. In various aspects, the processor 204 can cause the receiver 212 to decode and/or receive the UL message according to the associated tone plan.

Similarly, the STA 106A can determine the sub-band allocation based, for example, on the indication from the AP 104. In some aspects, the STA 106A can decode and/or receive the DL message from the AP 104 according to the associated tone plan (for example, via the receiver 212). In some aspects, the STA 106A can encode and/or transmit the UL message to the AP 104 according to the associated tone plan (for example, via the transmitter 210).

In various aspects, the uplink tone plan and the downlink tone plan can be the same. In various aspects, the message can include a symbol duration of 13.6 µs, 14.4 µs, or 16 µs.

In various aspects, the allocation can include determining an available bandwidth based on a communication mode of the apparatus. Allocating the sub-band of wireless communications to each of the plurality of devices can further include dividing the available bandwidth or available number of data tones into a plurality of sub-bands of frequencies or subsets of data tones, respectively.

In various aspects, processing the message can include encoding or decoding the message according to the downlink or uplink tone plan, respectively. Processing the message can further include transmitting or receiving the message to or from a device, respectively.

In various aspects, the uplink or downlink tone plan can use a Fast Fourier Transform (FFT) size of 64 if the bandwidth comprises 5 MHz. The uplink or downlink tone plan can use a FFT size of 128 if the bandwidth comprises 10 MHz. The uplink or downlink tone plan can use a FFT size of 64 if the bandwidth comprises 5 MHz. The uplink or downlink tone plan can use a FFT size of 128 if the bandwidth comprises 10 MHz. The uplink or downlink tone plan can use a FFT size of 192 if the bandwidth comprises 15 MHz. The uplink or downlink tone plan can use a FFT size of 256 if the bandwidth comprises 20 MHz. The uplink or downlink tone plan can use a FFT size of 384 if the bandwidth comprises 30 MHz. The uplink or downlink tone plan can use a FFT size of 512 if the bandwidth comprises 40 MHz. The uplink or downlink tone plan can use a FFT size of 768 if the bandwidth comprises 60 MHz. The uplink or downlink tone plan can use a FFT size of 1024 if the bandwidth comprises 80 MHz. The uplink or downlink tone plan can use a FFT size of 1280 if the bandwidth comprises 100 MHz. The uplink or downlink tone plan can use a FFT size of 1536 if the bandwidth comprises 120 MHz. The uplink or downlink tone plan can use a FFT size of 1792 if the bandwidth comprises 140 MHz. The uplink or downlink tone plan can use a FFT size of 2048 if the bandwidth comprises 160 MHz.

In various aspects, the uplink or downlink tone plan can include 10 data tones, 2 pilot tones, and 1 direct current (DC) tone if the tone plan has 16 FFT tones. The tone plan can include 38 data tones, 2 pilot tones, and 1 DC tone if the tone plan has 48 FFT tones. The tone plan can include 80 data tones, 4 pilot tones, and 1 DC tone if the tone plan has 96 FFT tones. The tone plan can include 171 data tones, 6 pilot tones, and 3 DC if the tone plan has 192 FFT tones. The tone plan can include 292 data tones, 8 pilot tones, and 5 DC if the tone plan has 320 FFT tones. The tone plan can include 350 data tones, 10 pilot tones, and 7 DC if the tone plan has 384 FFT tones. The tone plan can include 408 data tones, 10 pilot tones, and 9 DC if the tone plan has 448 FFT tones. The tone plan can include 702 data tones, 24 pilot tones, and 11 DC if the tone plan has 768 FFT tones. The tone plan can include 936 data tones, 32 pilot tones, and 11 DC if the tone plan has 1024 FFT tones. The tone plan can include 1170 data tones, 40 pilot tones, and 11 DC if the tone plan has 1280 FFT tones. The tone plan can include 1404 data tones, 48 pilot tones, and 11 DC if the tone plan has 1536 FFT tones. The tone plan can include 1638 data tones, 56 pilot tones, and 11 DC if the tone plan has 1792 FFT tones. The tone plan can include 1872 data tones, 64 pilot tones, and 11 DC if the tone plan has 2048 FFT tones.

In various aspects, each of the allocated subsets for the downlink tone plan can include no more than 13 data tones if a bandwidth of the subset includes 5 MHz. Each of the allocated subsets can include no more than 26 data tones if a bandwidth of the subset includes 10 MHz. Each of the allocated subsets can include no more than 39 data tones if a bandwidth of the subset includes 15 MHz. Each of the allocated subsets can include no more than 52 data tones if a bandwidth of the subset includes 20 MHz. Each of the allocated subsets can include no more than 81 data tones if a bandwidth of the subset includes 30 MHz. Each of the allocated subsets can include no more than 108 data tones if a bandwidth of the subset includes 40 MHz. Each of the allocated subsets can include no more than 175 data tones if a bandwidth of the subset includes 60 MHz. Each of the allocated subsets can include no more than 234 data tones if a bandwidth of the subset includes 80 MHz. Each of the allocated subsets can include no more than 292 data tones if a bandwidth of the subset includes 100 MHz. Each of the allocated subsets can include no more than 351 data tones if a bandwidth of the subset includes 120 MHz. Each of the allocated subsets can include no more than 409 data tones if a bandwidth of the subset includes 140 MHz.

In various aspects, each of the allocated subsets for the uplink tone plan can include no more than 10 data tones and 2 pilot tones if a bandwidth of the subset includes 5 MHz. Each of the allocated subsets can include no more than 23 data tones and 2 pilot tones if a bandwidth of the subset includes 10 MHz. Each of the allocated subsets can include no more than 35 data tones and 2 pilot tones if a bandwidth of the subset includes 15 MHz. Each of the allocated subsets can include no more than 46 data tones and 4 pilot tones if a bandwidth of the subset includes 20 MHz. Each of the allocated subsets can include no more than 77 data tones and 4 pilot tones if a bandwidth of the subset includes 30 MHz. Each of the allocated subsets can include no more than 102 data tones and 6 pilot tones if a bandwidth of the subset includes 40 MHz. Each of the allocated subsets can include no more than 171 data tones and 6 pilot tones if a bandwidth of the subset includes 60 MHz. Each of the allocated subsets can include no more than 228 data tones and 8 pilot tones if a bandwidth of the subset includes 80 MHz. Each of the allocated subsets can include no more than 290 data tones and 8 pilot tones if a bandwidth of the subset includes 100 MHz. Each of the allocated subsets can include no more than 348 data tones and 10 pilot tones if a bandwidth of the subset includes 120 MHz. Each of the allocated subsets can include no more than 408 data tones and 10 pilot tones if a bandwidth of the subset includes 140 MHz.

In an aspect, the method shown in FIG. 5 can be implemented in a wireless device that can include an allocating circuit, a providing circuit, and a processing circuit. Those skilled in the art will appreciate that a wireless device can have more components than the simplified wireless device described herein. The wireless device described herein includes only those components useful for describing some prominent features of implementations within the scope of the claims.

The allocating circuit can be configured to allocate the sub-band of wireless communications to each of the plurality of devices. In an aspect, the allocating circuit can be configured to implement block 510 of the flowchart 500 (FIG. 5). The allocating circuit can include one or more of the DSP 220 (FIG. 2), the processor 204 (FIG. 2), and the memory 206 (FIG. 2). In some implementations, means for allocating can include the allocating circuit.

The providing circuit can be configured to provide the sub-band allocations to the devices. In an aspect, the providing circuit can be configured to implement block 520 of the flowchart 500 (FIG. 5). The providing circuit can include one or more of the transmitter 210 (FIG. 2), the transceiver 214 (FIG. 2), the processor 206 (FIG. 2), the DSP 220 (FIG. 2), and the memory 204 (FIG. 2). In some implementations, means for providing can include the providing circuit.

The processing circuit can be configured to process the message according to the tone plan. In an aspect, the processing circuit can be configured to implement block 530 of the flowchart 500 (FIG. 5). The processing circuit can include one or more of the transmitter 210 (FIG. 2), the receiver 212 (FIG. 2), the transceiver 214 (FIG. 2), the antenna 216 (FIG. 2), the processor 206 (FIG. 2), the DSP 220 (FIG. 2), and the memory 204 (FIG. 2). In some implementations, means for processing can include the processing circuit.

In some aspects, APs 104 can control access to a wireless medium by allocating subsets of a single tone plan to HEW STAs, for each of UL and DL communications. For example, with respect to FIG. 1, STAs 106A-106D can be HEW STAs. In this aspect, it can be desirable to increase the total number of data/pilot tones across an OFDMA zone. In some aspects, increased efficiency within a single tone plan can make concurrent legacy operation infeasible. In some aspects, the AP 104 can be configured to allocate separate tone subsets, within a single uplink or downlink tone plan, to each of the STAs 106A-106D. Thus, each STA 106A-106D can be configured to access its allocated subset of tones according to a single tone plan (which can also be referred to as a tone map).

Figure 6:
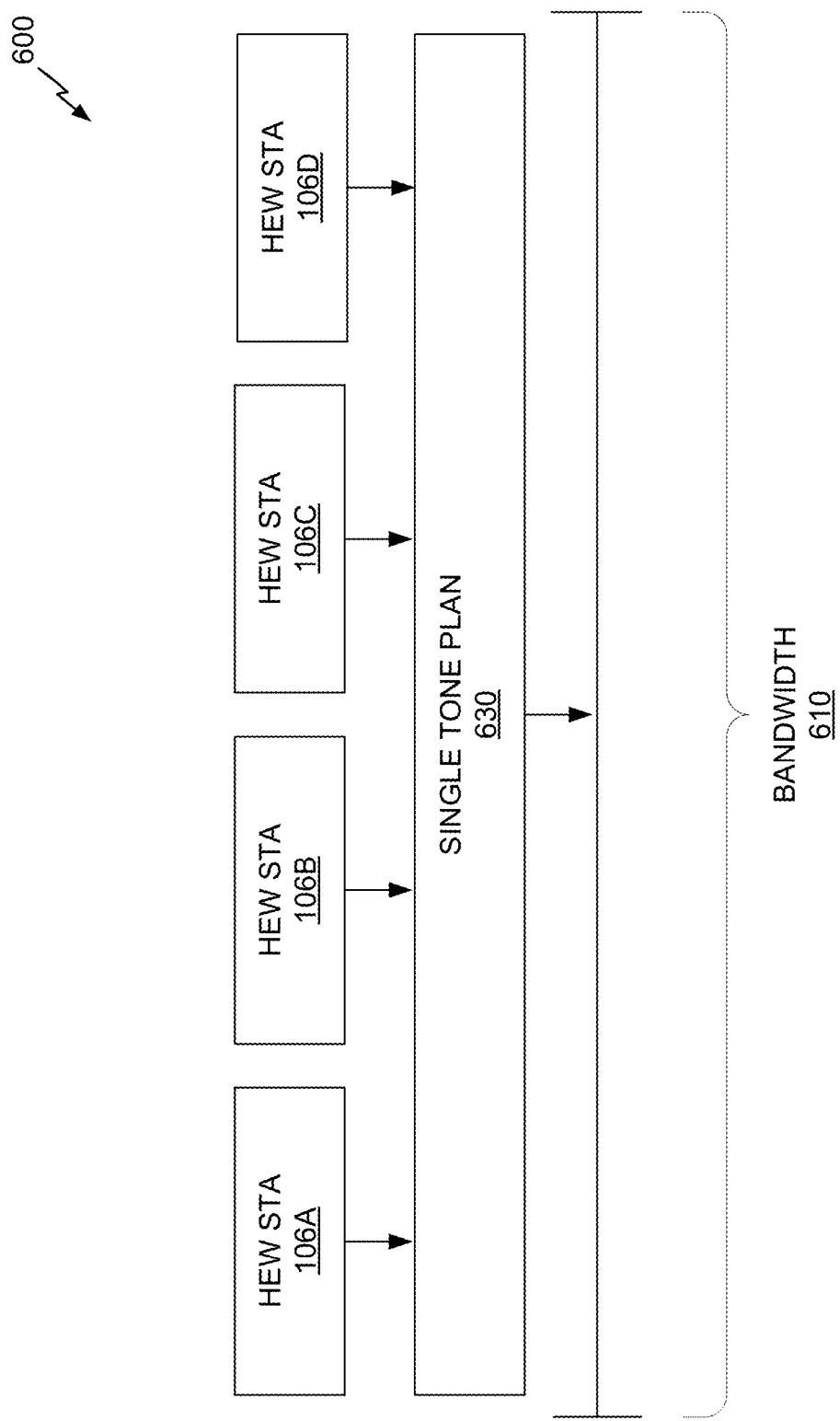
FIG. 6 is a diagram of an exemplary bandwidth allocation, according to one aspect.

FIG. 6 is a diagram of an exemplary bandwidth allocation 600, according to one aspect. As shown in FIG. 6, an OFDMA zone can include a bandwidth 610. The entire bandwidth 610 can be associated with a single tone plan 630 for uplink communications and a single tone plan 630 for downlink communications. The single tone plan 630 can be split among a plurality of devices, such as the HEW STAs 106A-106D.

Referring to FIGS. 1 and 6, the AP 104 can allocate a subset of data/pilot tones, in the single tone plan 630, to each of the STAs 106A-106D. Although four STAs 106A-106D are shown, the single tone plan 630 can be divided into any number of tone subsets. In various aspects, the allocated subsets can be contiguous, evenly spaced, or intermittently spaced among the data/pilot tones defined in the single tone plan 630. In some aspects, the single tone plan 630 can be divided evenly between the STAs 106A-106D. In other aspects, differing numbers of tones can be allocated between the STAs 106A-106D.

In various aspects, the single tone plans 630 can have various Fast Fourier Transform (FFT) sizes based on the bandwidth 610 of the OFDMA zone. Although the term FFT is used herein, a person having ordinary skill in the art will appreciate that other transforms can be used in various circumstances, such as a Discrete Fourier Transform (DFT), an inverse DFT (IDFT), and an inverse FFT (IFFT). Table 1, above, shows exemplary tone plan sizes for various symbol duration modes, according to various aspects.

Thus, in the exemplary aspect where the bandwidth 610 is 80 MHz, the STAs 106A-106D can transmit and/or receive 1× symbol duration messages according to a 256-tone plan, and can transmit and/or receive 4× symbol duration messages according to a 1024-tone plan. Moreover, because each of the STAs 106A-106D share a physical channel, the HEW STAs 106A-106D may not interoperate with legacy STAs within the single tone plan 630.

Each of the FFT sizes shown above in Table 1 can be associated with single tone plan 630 for UL and for DL. In some aspects, the single tone plan 630 is the same for UL and DL communications. In other aspects, the single tone plan 630 is different for UL than for DL communications. An exemplary tone plan is discussed above with respect to FIG. 4. Because each of the STAs 106A-106D transmits and/or receives messages according to the same single tone plan 630, one or more mid-tones (for example, sub-band guard tones), sub-band DC tones, and sub-band pilot tones can be replaced with data tones (as compared with the multicarrier tone allocation discussed above with respect to FIG. 3).

Although a 16-tone plan 400 is discussed above with respect to FIG. 4, similar tone plans can be used (such as 32-, 48-, 64-, 96-, 128-, 192-, 256-, 320-, 384-, 448-, 512-, 768-, 1024-, 1280-, 1536-, 1792-, and 2048-tone plans). Table 2, above, shows exemplary tone plans for various FFT sizes, according to various aspects. A person having ordinary skill in the art will appreciate that other combinations of data, pilot, DC, and guard tones can be used.

As discussed above, data/pilot tones of the single tone plan 630 can be allocated between a plurality of devices based on a sub-band or subset bandwidth allocated to each device. Table 3, below, shoes exemplary tone allocations, for various sub-band bandwidths in a single DL tone plan 630. Although sub-band bandwidths of 5 MHz, 10 MHz, 15 MHz, 20 MHz, 30 MHz, 40 MHz, 60 MHz, 80 MHz, 100 MHz, 120 MHz, and 140 MHz are shown, a person having ordinary skill in the art will appreciate that other bandwidths and tone allocations can be used.

TABLE 3

| Sub-Band Bandwidth (MHz) | Data Tones |
| --- | --- |
| 5 | 13 |
| 10 | 26 |
| 15 | 39 |

TABLE 3-continued

| Sub-Band Bandwidth (MHz) | Data Tones |
|---|---|
| 20 | 52 |
| 30 | 81 |
| 40 | 108 |
| 60 | 175 |
| 80 | 234 |
| 100 | 292 |
| 120 | 351 |
| 140 | 409 |

In various aspects, for DL communications, the single tone plan 630 can include common pilots for per-device phase tracking. In various aspects, for DL communications, the single tone plan 630 can omit sub-band DC tones. In various aspects, for DL communications, the single tone plan 630 can omit guard tones between device allocations. For example, the AP 104 (FIG. 1) can be configured to synchronize transmission and maintain orthogonally between subsets of tones. In various aspects, for DL communications, a wideband transmission mask can be applied.

For UL communications, similar allocations can be used, with the addition of per-device pilot tones and guard tones between subset allocations. Table 4, below, shoes exemplary tone allocations, for various sub-band bandwidths in a single UL tone plan 630. Although sub-band bandwidths of 5 MHz, 10 MHz, 15 MHz, 20 MHz, 30 MHz, 40 MHz, 60 MHz, 80 MHz, 100 MHz, 120 MHz, and 140 MHz are shown, a person having ordinary skill in the art will appreciate that other bandwidths and tone allocations can be used.

TABLE 4

| Sub-Band Bandwidth (MHz) | Data Tones | Pilot Tones | Guard Tones |
|---|---|---|---|
| 5 | 10 | 2 | 2 |
| 10 | 23 | 2 | 2 |
| 15 | 35 | 2 | 2 |
| 20 | 46 | 4 | 2 |
| 30 | 77 | 4 | 2 |
| 40 | 102 | 6 | 2 |
| 60 | 171 | 6 | 2 |
| 80 | 228 | 8 | 2 |
| 100 | 290 | 8 | 2 |
| 120 | 348 | 10 | 2 |
| 140 | 408 | 10 | 2 |

In various aspects, for UL communications, the single tone plan 630 can include per-device pilot tones. In various aspects, for UL communications, the single tone plan 630 can omit sub-band DC tones. In various aspects, for UL communications, the single tone plan 630 can include one or more guard tones between device allocations. For example, the single tone plan 630 can include 2 guard tones between each subset of tones. Although Table 4 assumes four subsets each having 2 guard (and therefore 6 mid guard tones), the single tone plan 630 can be divided into different numbers of tone subsets. In various aspects, for DL communications, a sub-band transmission mask can be applied.

Figure 7:
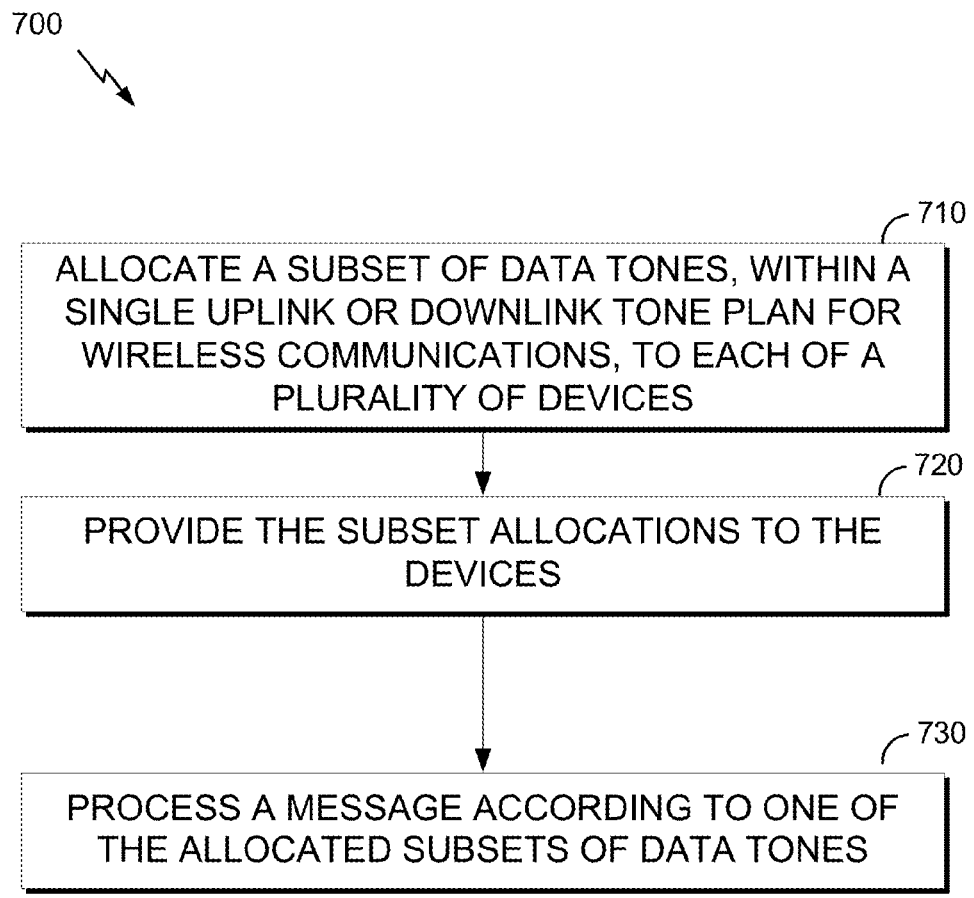
FIG. 7 shows a flowchart for another exemplary method of wireless communication that can be employed within the wireless communication system of FIG. 1.

FIG. 7 shows a flowchart 700 for another exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the wireless device 202 discussed above with respect to FIG. 2, the bandwidth allocation 300 discussed above with respect to FIG. 3, and the tone plan 400 discussed above with respect to FIG. 4, a person having ordinary skill in the art will appreciate that the illustrated method can be implemented by another device described herein, or any other suitable device. Although the illustrated method is described herein with reference to a particular order, in various aspects, blocks herein can be performed in a different order, or omitted, and additional blocks can be added.

First, at block 710 the device 202 allocates a subset of data tones, within a single uplink or downlink town plan, for wireless communications, to each of a plurality of devices. For example, the AP 104 can allocate any combination of the subsets shown above in Tables 3 and 4 to the STAs 106A-106D. In various aspects, the single tone plan can occupy any of the bandwidths discussed above with respect to Table 1, and can be associated with a tone plan having any FFT size discussed above with respect to Table 2. In some aspects, the device 202 can allocate a resource including both a sub-band of frequencies and the subset of data tones within a single uplink or downlink tone plan.

In one aspect, the processor 204 can determine an available amount of tones and a number of devices requesting access to the wireless medium. The processor 204 can allocate a maximum subset size to each device such that the available bandwidth is not exceeded. For example, the AP 104 can divide the 80 MHz OFDMA zone 310 by the number of STAs 106A-106D (four) and allocate 20 MHz sub-bands 320A-320B to each STA 106A-106D. In various other aspects, the processor 204 can allocate a larger sub-band to certain devices, for example based on a priority or capability of the STAs 106A-106D. Thus, for DL communications, the AP 104 can divide the 234 available data tones and allocate 52 data tones of the single DL tone plan 630 to each device. For UL communications, the AP 104 can divide the 234 available data tones, and 8 available pilot tones, and allocate 46 data tones, 4 pilot tones, and 2 guard tones of the single tone plan 630 to each device.

Next, at block 720, the device 202 provides the subset allocations to the devices. For example, the AP 104 can transmit an indication of the subset allocation to each STA 106A-106D. In particular, the processor 204 can cause the transmitter 210 to transmit the sub-band allocations to the STAs 106A-106D.

Then, at block 730, the device 202 processes a message according to the single tone plan and the allocated subset of data tones. For example, the AP 104 can transmit a DL message to the STA 106A according to the single DL tone plan 630. Because the OFDMA zone occupies 80 MHz in an aspect, the AP 104 can encode and/or transmit the DL message according to a 256-tone plan. Because the allocated subset of data tones occupies 20 MHz in an aspect, the AP 104 can include 52 data tones in the 256-tone plan for the STA 106A. In various aspects, the processor 204 can cause the transmitter 210 to encode and/or transmit the DL message according to the allocated subset of data tones. In some aspects, the tone plan can be associated with both an allocated sub-band of frequencies and the allocated subset of data tones.

As another example, the AP 104 can receive a UL message from the STA 106A according to the single UL tone plan 630. Because the OFDMA zone occupies 80 MHz in an aspect, the AP 104 can decode and/or receive the UL message according to a 256-tone plan. Because the allocated subset of data tones occupies 20 MHz in an aspect, the AP 104 can associate 46 data tones and 4 pilot tones in the 256-tone plan with the STA 106A. In various aspects, the processor 204 can cause the receiver 212 to decode and/or receive the UL message according to the allocated subset of tones.

Similarly, the STA 106A can determine the subset allocation based, for example, on the indication from the AP 104. In some aspects, the STA 106A can decode and/or receive the DL message from the AP 104 according to the allocated subset of tones (for example, via the receiver 212). In some aspects, the STA 106A can encode and/or transmit the UL message to the AP 104 according to the allocated subset of tones (for example, via the transmitter 210).

In various aspects, the uplink tone plan can be different from the downlink tone plan. In various aspects, each of the allocated subsets can further include one or more pilot tones. In various aspects, the message can include a symbol duration of 13.6 μs, 14.4 μs, or 16 μs.

In various aspects, allocating the subset of data tones can include determining an available number of data tones based on a communication mode of the apparatus. Allocating the subset of data tones can further include dividing the available data tones into a plurality of subsets.

In various aspects, processing the message can include encoding or decoding the message according to the allocated subset of the single downlink or uplink tone plan, respectively. Processing the message can further include transmitting or receiving the message to or from a device, respectively.

In various aspects, the uplink or downlink tone plan can use a Fast Fourier Transform (FFT) size of 64 if the bandwidth comprises 5 MHz. The uplink or downlink tone plan can use a FFT size of 128 if the bandwidth comprises 10 MHz. The uplink or downlink tone plan can use a FFT size of 64 if the bandwidth comprises 5 MHz. The uplink or downlink tone plan can use a FFT size of 128 if the bandwidth comprises 10 MHz. The uplink or downlink tone plan can use a FFT size of 192 if the bandwidth comprises 15 MHz. The uplink or downlink tone plan can use a FFT size of 256 if the bandwidth comprises 20 MHz. The uplink or downlink tone plan can use a FFT size of 384 if the bandwidth comprises 30 MHz. The uplink or downlink tone plan can use a FFT size of 512 if the bandwidth comprises 40 MHz. The uplink or downlink tone plan can use a FFT size of 768 if the bandwidth comprises 60 MHz. The uplink or downlink tone plan can use a FFT size of 1024 if the bandwidth comprises 80 MHz. The uplink or downlink tone plan can use a FFT size of 1280 if the bandwidth comprises 100 MHz. The uplink or downlink tone plan can use a FFT size of 1536 if the bandwidth comprises 120 MHz. The uplink or downlink tone plan can use a FFT size of 1792 if the bandwidth comprises 140 MHz. The uplink or downlink tone plan can use a FFT size of 2048 if the bandwidth comprises 160 MHz.

In various aspects, the uplink or downlink tone plan can include 10 data tones, 2 pilot tones, and 1 direct current (DC) tone if the tone plan has 16 FFT tones. The tone plan can include 38 data tones, 2 pilot tones, and 1 DC tone if the tone plan has 48 FFT tones. The tone plan can include 80 data tones, 4 pilot tones, and 1 DC tone if the tone plan has 96 FFT tones. The tone plan can include 171 data tones, 6 pilot tones, and 3 DC if the tone plan has 192 FFT tones. The tone plan can include 292 data tones, 8 pilot tones, and 5 DC if the tone plan has 320 FFT tones. The tone plan can include 350 data tones, 10 pilot tones, and 7 DC if the tone plan has 384 FFT tones. The tone plan can include 408 data tones, 10 pilot tones, and 9 DC if the tone plan has 448 FFT tones. The tone plan can include 702 data tones, 24 pilot tones, and 11 DC if the tone plan has 768 FFT tones. The tone plan can include 936 data tones, 32 pilot tones, and 11 DC if the tone plan has 1024 FFT tones. The tone plan can include 1170 data tones, 40 pilot tones, and 11 DC if the tone plan has 1280 FFT tones. The tone plan can include 1404 data tones, 48 pilot tones, and 11 DC if the tone plan has 1536 FFT tones. The tone plan can include 1638 data tones, 56 pilot tones, and 11 DC if the tone plan has 1792 FFT tones. The tone plan can include 1872 data tones, 64 pilot tones, and 11 DC if the tone plan has 2048 FFT tones.

In various aspects, each of the allocated subsets for the downlink tone plan can include no more than 13 data tones if a bandwidth of the subset includes 5 MHz. Each of the allocated subsets can include no more than 26 data tones if a bandwidth of the subset includes 10 MHz. Each of the allocated subsets can include no more than 39 data tones if a bandwidth of the subset includes 15 MHz. Each of the allocated subsets can include no more than 52 data tones if a bandwidth of the subset includes 20 MHz. Each of the allocated subsets can include no more than 81 data tones if a bandwidth of the subset includes 30 MHz. Each of the allocated subsets can include no more than 108 data tones if a bandwidth of the subset includes 40 MHz. Each of the allocated subsets can include no more than 175 data tones if a bandwidth of the subset includes 60 MHz. Each of the allocated subsets can include no more than 234 data tones if a bandwidth of the subset includes 80 MHz. Each of the allocated subsets can include no more than 292 data tones if a bandwidth of the subset includes 100 MHz. Each of the allocated subsets can include no more than 351 data tones if a bandwidth of the subset includes 120 MHz. Each of the allocated subsets can include no more than 409 data tones if a bandwidth of the subset includes 140 MHz.

In various aspects, each of the allocated subsets for the uplink tone plan can include no more than 10 data tones and 2 pilot tones if a bandwidth of the subset includes 5 MHz. Each of the allocated subsets can include no more than 23 data tones and 2 pilot tones if a bandwidth of the subset includes 10 MHz. Each of the allocated subsets can include no more than 35 data tones and 2 pilot tones if a bandwidth of the subset includes 15 MHz. Each of the allocated subsets can include no more than 46 data tones and 4 pilot tones if a bandwidth of the subset includes 20 MHz. Each of the allocated subsets can include no more than 77 data tones and 4 pilot tones if a bandwidth of the subset includes 30 MHz. Each of the allocated subsets can include no more than 102 data tones and 6 pilot tones if a bandwidth of the subset includes 40 MHz. Each of the allocated subsets can include no more than 171 data tones and 6 pilot tones if a bandwidth of the subset includes 60 MHz. Each of the allocated subsets can include no more than 228 data tones and 8 pilot tones if a bandwidth of the subset includes 80 MHz. Each of the allocated subsets can include no more than 290 data tones and 8 pilot tones if a bandwidth of the subset includes 100 MHz. Each of the allocated subsets can include no more than 348 data tones and 10 pilot tones if a bandwidth of the subset includes 120 MHz. Each of the allocated subsets can include no more than 408 data tones and 10 pilot tones if a bandwidth of the subset includes 140 MHz.

In an aspect, the method shown in FIG. 7 can be implemented in a wireless device that can include an allocating circuit, a providing circuit, and a processing circuit. Those skilled in the art will appreciate that a wireless device can have more components than the simplified wireless device described herein. The wireless device described herein includes only those components useful for describing some prominent features of implementations within the scope of the claims.

The allocating circuit can be configured to allocate the subset of data tones. In an aspect, the allocating circuit can be configured to implement block 710 of the flowchart 700 (FIG. 7). The allocating circuit can include one or more of the DSP 220 (FIG. 2), the processor 204 (FIG. 2), and the memory 206 (FIG. 2). In some implementations, means for allocating can include the allocating circuit.

The providing circuit can be configured to provide the subset allocations to the devices. In an aspect, the providing circuit can be configured to implement block 720 of the flowchart 700 (FIG. 7). The providing circuit can include one or more of the transmitter 210 (FIG. 2), the transceiver 214 (FIG. 2), the processor 206 (FIG. 2), the DSP 220 (FIG. 2), and the memory 204 (FIG. 2). In some implementations, means for providing can include the providing circuit.

The processing circuit can be configured to process the message according to the allocated subset of tones. In an aspect, the processing circuit can be configured to implement block 730 of the flowchart 700 (FIG. 7). The processing circuit can include one or more of the transmitter 210 (FIG. 2), the receiver 212 (FIG. 2), the transceiver 214 (FIG. 2), the antenna 216 (FIG. 2), the processor 206 (FIG. 2), the DSP 220 (FIG. 2), and the memory 204 (FIG. 2). In some implementations, means for processing can include the processing circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-a, a-b, a-c, b-b, b-c, c-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus for wireless communication, comprising:
   a processing system configured to:
   allocate a different resource for wireless communication to each of a plurality of devices, the resource comprising at least one of a sub-band of frequencies or a subset of data tones within a single uplink or downlink tone plan common across all allocated resources;
   provide the resource allocation to the devices; and
   process a message according to one of an uplink or downlink tone plan associated with at least one of the allocated sub-band or the allocated subset, each of the allocated subsets comprising one or more pilot tones.

2. The apparatus of claim 1, wherein the uplink tone plan and the downlink tone plan are the same.

3. The apparatus of claim 1, wherein the uplink tone plan is different from the downlink tone plan.

4. The apparatus of claim 1, wherein the message comprises a symbol duration of 13.6 µs or 14.4 µs.

5. The apparatus of claim 1, wherein the processing system is further configured to allocate the resource by:
   determining at least one of an available bandwidth or an available number of data tones, based on a communication mode of the apparatus; and
   dividing the available bandwidth or available number of data tones into a plurality of sub-bands of frequencies or subsets of data tones, respectively.

6. The apparatus of claim 1, wherein the processing system is further configured to encode or decode the message according to the downlink or uplink tone plan, respectively.

7. The apparatus of claim 1, wherein the uplink or downlink tone plan uses a Fast Fourier Transform (FFT) size of:
   64 if the bandwidth comprises 5 MHz;
   128 if the bandwidth comprises 10 MHz;
   192 if the bandwidth comprises 15 MHz;
   384 if the bandwidth comprises 30 MHz;
   768 if the bandwidth comprises 60 MHz;
   1280 if the bandwidth comprises 100 MHz;
   1536 if the bandwidth comprises 120 MHz; and
   1792 if the bandwidth comprises 140 MHz.

8. The apparatus of claim 1, wherein the uplink or downlink tone plan uses a Fast Fourier Transform (FFT) size of:
   256 if the bandwidth comprises 20 MHz;
   512 if the bandwidth comprises 40 MHz;
   1024 if the bandwidth comprises 80 MHz; and
   2048 if the bandwidth comprises 160 MHz.

9. The apparatus of claim 1, wherein the uplink or downlink tone plan comprises:
   10 data tones, 2 pilot tones, and 1 direct current (DC) tone if tone plan has 16 Fast Fourier Transform (FFT) tones;
   38 data tones, 2 pilot tones, and 1 DC tone if the tone plan has 48 FFT tones;
   80 data tones, 4 pilot tones, and 1 DC tone if the tone plan has 96 FFT tones;
   171 data tones, 6 pilot tones, and 3 DC if the tone plan has 192 FFT tones;
   292 data tones, 8 pilot tones, and 5 DC if the tone plan has 320 FFT tones;
   350 data tones, 10 pilot tones, and 7 DC if the tone plan has 384 FFT tones;
   408 data tones, 10 pilot tones, and 9 DC if the tone plan has 448 FFT tones;
   702 data tones, 24 pilot tones, and 11 DC if the tone plan has 768 FFT tones;
   936 data tones, 32 pilot tones, and 11 DC if the tone plan has 1024 FFT tones;
   1170 data tones, 40 pilot tones, and 11 DC if the tone plan has 1280 FFT tones;
   1404 data tones, 48 pilot tones, and 11 DC if the tone plan has 1536 FFT tones;
   1638 data tones, 56 pilot tones, and 11 DC if the tone plan has 1792 FFT tones; and
   1872 data tones, 64 pilot tones, and 11 DC if the tone plan has 2048 FFT tones.

10. The apparatus of claim 1, wherein each of the allocated subsets for the downlink tone plan comprises no more than:
   13 data tones if a bandwidth of the subset comprises 16 Fast Fourier Transform (FFT) tones;
   26 data tones if a bandwidth of the subset comprises 32 FFT tones;
   39 data tones if a bandwidth of the subset comprises 48 FFT tones;
   52 data tones if a bandwidth of the subset comprises 64 FFT tones;
   81 data tones if a bandwidth of the subset comprises 96 FFT tones;
   108 data tones if a bandwidth of the subset comprises 128 FFT tones;
   175 data tones if a bandwidth of the subset comprises 192 FFT tones;
   234 data tones if a bandwidth of the subset comprises 256 FFT tones;
   292 data tones if a bandwidth of the subset comprises 320 FFT tones;

351 data tones if a bandwidth of the subset comprises 384 FFT tones; and 409 data tones if a bandwidth of the subset comprises 448 FFT tones.

11. The apparatus of claim 1, wherein each of the allocated subsets for the uplink tone plan comprises no more than:

10 data tones and 2 pilot tones if a bandwidth of the subset comprises 16 Fast Fourier Transform (FFT) tones;

23 data tones and 2 pilot tones if a bandwidth of the subset comprises 32 FFT tones;

35 data tones and 2 pilot tones if a bandwidth of the subset comprises 48 FFT tones;

46 data tones and 4 pilot tones if a bandwidth of the subset comprises 64 FFT tones;

77 data tones and 4 pilot tones if a bandwidth of the subset comprises 96 FFT tones;

102 data tones and 6 pilot tones if a bandwidth of the subset comprises 128 FFT tones;

171 data tones and 6 pilot tones if a bandwidth of the subset comprises 192 FFT tones;

228 data tones and 8 pilot tones if a bandwidth of the subset comprises 256 FFT tones;

290 data tones and 8 pilot tones if a bandwidth of the subset comprises 320 FFT tones;

348 data tones and 10 pilot tones if a bandwidth of the subset comprises 384 FFT tones; and 408 data tones and 10 pilot tones if a bandwidth of the subset comprises 448 FFT tones.

12. A method of wireless communication, comprising:

allocating a different resource for wireless communication to each of a plurality of devices, the resource comprising at least one of a sub-band of frequencies or a subset of data tones within a single uplink or downlink tone plan common across all allocated resources;

providing the resource allocation to the devices; and processing a message according to one of an uplink or downlink tone plan associated with at least one of the allocated sub-band or the allocated subset, each of the allocated subsets comprising one or more pilot tones.

13. The method of claim 12, wherein the uplink tone plan and the downlink tone plan are the same.

14. The method of claim 12, wherein the uplink tone plan is different from the downlink tone plan.

15. The method of claim 12, wherein the message comprises a symbol duration of 13.6 µs or 14.4 µs.

16. The method of claim 12, wherein said allocating comprises:

determining at least one of an available bandwidth or an available number of data tones, based on a communication mode of the apparatus; and dividing the available bandwidth or available number of data tones into a plurality of sub-bands of frequencies or subsets of data tones, respectively.

17. The method of claim 12, further comprising encoding or decoding the message according to the downlink or uplink tone plan, respectively.

18. The method of claim 12, wherein the uplink or downlink tone plan uses a Fast Fourier Transform (FFT) size of:

64 if the bandwidth comprises 5 MHz;
128 if the bandwidth comprises 10 MHz;
192 if the bandwidth comprises 15 MHz;
384 if the bandwidth comprises 30 MHz;
768 if the bandwidth comprises 60 MHz;
1280 if the bandwidth comprises 100 MHz;
1536 if the bandwidth comprises 120 MHz; and
1792 if the bandwidth comprises 140 MHz.

19. The method of claim 12, wherein the uplink or downlink tone plan uses a Fast Fourier Transform (FFT) size of:

256 if the bandwidth comprises 20 MHz;
512 if the bandwidth comprises 40 MHz;
1024 if the bandwidth comprises 80 MHz; and
2048 if the bandwidth comprises 160 MHz.

20. The method of claim 12, wherein the uplink or downlink tone plan comprises:

10 data tones, 2 pilot tones, and 1 direct current (DC) tone if tone plan has 16 Fast Fourier Transform (FFT) tones;

38 data tones, 2 pilot tones, and 1 DC tone if the tone plan has 48 FFT tones;

80 data tones, 4 pilot tones, and 1 DC tone if the tone plan has 96 FFT tones;

171 data tones, 6 pilot tones, and 3 DC if the tone plan has 192 FFT tones;

292 data tones, 8 pilot tones, and 5 DC if the tone plan has 320 FFT tones;

350 data tones, 10 pilot tones, and 7 DC if the tone plan has 384 FFT tones;

408 data tones, 10 pilot tones, and 9 DC if the tone plan has 448 FFT tones;

702 data tones, 24 pilot tones, and 11 DC if the tone plan has 768 FFT tones;

936 data tones, 32 pilot tones, and 11 DC if the tone plan has 1024 FFT tones;

1170 data tones, 40 pilot tones, and 11 DC if the tone plan has 1280 FFT tones;

1404 data tones, 48 pilot tones, and 11 DC if the tone plan has 1536 FFT tones;

1638 data tones, 56 pilot tones, and 11 DC if the tone plan has 1792 FFT tones; and 1872 data tones, 64 pilot tones, and 11 DC if the tone plan has 2048.

21. The method of claim 12, wherein each of the allocated subsets for the downlink tone plan comprise no more than:

13 data tones if a bandwidth of the subset comprises 16 Fast Fourier Transform (FFT) tones;

26 data tones if a bandwidth of the subset comprises 32 FFT tones;

39 data tones if a bandwidth of the subset comprises 48 FFT tones;

52 data tones if a bandwidth of the subset comprises 64 FFT tones;

81 data tones if a bandwidth of the subset comprises 96 FFT tones;

108 data tones if a bandwidth of the subset comprises 128 FFT tones;

175 data tones if a bandwidth of the subset comprises 192 FFT tones;

234 data tones if a bandwidth of the subset comprises 256 FFT tones;

292 data tones if a bandwidth of the subset comprises 320 FFT tones;

351 data tones if a bandwidth of the subset comprises 384 FFT tones; and 409 data tones if a bandwidth of the subset comprises 448 FFT tones.

22. The method of claim 12, wherein each of the allocated subsets for the uplink tone plan comprise no more than:

10 data tones and 2 pilot tones if a bandwidth of the subset comprises 16 Fast Fourier Transform (FFT) tones;

23 data tones and 2 pilot tones if a bandwidth of the subset comprises 32 FFT tones;

35 data tones and 2 pilot tones if a bandwidth of the subset comprises 48 FFT tones;
46 data tones and 4 pilot tones if a bandwidth of the subset comprises 64 FFT tones;
77 data tones and 4 pilot tones if a bandwidth of the subset comprises 96 FFT tones;
102 data tones and 6 pilot tones if a bandwidth of the subset comprises 128 FFT tones;
171 data tones and 6 pilot tones if a bandwidth of the subset comprises 192 FFT tones;
228 data tones and 8 pilot tones if a bandwidth of the subset comprises 256 FFT tones;
290 data tones and 8 pilot tones if a bandwidth of the subset comprises 320 FFT tones;
348 data tones and 10 pilot tones if a bandwidth of the subset comprises 384 FFT tones; and
408 data tones and 10 pilot tones if a bandwidth of the subset comprises 448 FFT tones.

23. An apparatus for wireless communication, comprising:
means for allocating a different resource for wireless communication to each of a plurality of devices, the resource comprising at least one of a sub-band of frequencies or a subset of data tones within a single uplink or downlink tone plan common across all allocated resources;
means for providing the resource allocation to the devices; and
means for processing a message according to one of an uplink or downlink tone plan associated with at least one of the allocated sub-band or the allocated subset, each of the allocated subsets comprising one or more pilot tones.

24. The apparatus of claim 23, wherein the uplink or downlink tone plan uses a Fast Fourier Transform (FFT) size of:
64 if the bandwidth comprises 5 MHz;
128 if the bandwidth comprises 10 MHz;
192 if the bandwidth comprises 15 MHz;
384 if the bandwidth comprises 30 MHz;
768 if the bandwidth comprises 60 MHz;
1280 if the bandwidth comprises 100 MHz;
1536 if the bandwidth comprises 120 MHz; and
1792 if the bandwidth comprises 140 MHz.

25. The apparatus of claim 23, wherein the uplink or downlink tone plan uses a Fast Fourier Transform (FFT) size of:
256 if the bandwidth comprises 20 MHz;
512 if the bandwidth comprises 40 MHz;
1024 if the bandwidth comprises 80 MHz; and
2048 if the bandwidth comprises 160 MHz.

26. The apparatus of claim 23, wherein each of the allocated subsets for the downlink tone plan comprises no more than:
13 data tones if a bandwidth of the subset comprises 16 Fast Fourier Transform (FFT) tones;
26 data tones if a bandwidth of the subset comprises 32 FFT tones;
39 data tones if a bandwidth of the subset comprises 48 FFT tones;
52 data tones if a bandwidth of the subset comprises 64 FFT tones;
81 data tones if a bandwidth of the subset comprises 96 FFT tones;
108 data tones if a bandwidth of the subset comprises 128 FFT tones;
175 data tones if a bandwidth of the subset comprises 192 FFT tones;
234 data tones if a bandwidth of the subset comprises 256 FFT tones;
292 data tones if a bandwidth of the subset comprises 320 FFT tones;
351 data tones if a bandwidth of the subset comprises 384 FFT tones; and
409 data tones if a bandwidth of the subset comprises 448 FFT tones.

27. The apparatus of claim 23, wherein each of the allocated subsets for the uplink tone plan comprises no more than:
10 data tones and 2 pilot tones if a bandwidth of the subset comprises 16 Fast Fourier Transform (FFT) tones;
23 data tones and 2 pilot tones if a bandwidth of the subset comprises 32 FFT tones;
35 data tones and 2 pilot tones if a bandwidth of the subset comprises 48 FFT tones;
46 data tones and 4 pilot tones if a bandwidth of the subset comprises 64 FFT tones;
77 data tones and 4 pilot tones if a bandwidth of the subset comprises 96 FFT tones;
102 data tones and 6 pilot tones if a bandwidth of the subset comprises 128 FFT tones;
171 data tones and 6 pilot tones if a bandwidth of the subset comprises 192 FFT tones;
228 data tones and 8 pilot tones if a bandwidth of the subset comprises 256 FFT tones;
290 data tones and 8 pilot tones if a bandwidth of the subset comprises 320 FFT tones;
348 data tones and 10 pilot tones if a bandwidth of the subset comprises 384 FFT tones; and
408 data tones and 10 pilot tones if a bandwidth of the subset comprises 448 FFT tones.

28. A wireless node, comprising:
an antenna;
a processing system configured to:
allocate a different resource for wireless communication to each of a plurality of devices, the resource comprising at least one of a sub-band of frequencies or a subset of data tones within a single uplink or downlink tone plan, common across all allocated resources;
provide the resource allocation to the devices via the antenna; and
process a message according to one of an uplink or downlink tone plan associated with at least one of the allocated sub-band or the allocated subset, each of the allocated subsets comprising one or more pilot tones.

* * * * *